US005258764A

United States Patent [19]

Malinowski

[11] Patent Number: 5,258,764

[45] Date of Patent: Nov. 2, 1993

[54] SATELLITE ORIENTATION DETECTION SYSTEM

[75] Inventor: Frank R. Malinowski, Santa Barbara, Calif.

[73] Assignee: Santa Barbara Research Center, Goleta, Calif.

[21] Appl. No.: 766,695

[22] Filed: Sep. 26, 1991

[51] Int. Cl.[5] ........................ H01Q 3/00; H01Q 21/06; H04B 7/185

[52] U.S. Cl. .................................... 342/359; 342/355; 342/358; 342/362

[58] Field of Search ............... 342/352, 355, 361, 362, 342/365, 77, 359, 363

[56] References Cited

U.S. PATENT DOCUMENTS

| | | | |
|---|---|---|---|
| 3,000,598 | 9/1961 | Bush | 244/3.13 |
| 3,137,853 | 6/1964 | Cutler | 342/355 |
| 3,701,160 | 10/1972 | Beguin | 343/756 |
| 4,072,281 | 2/1978 | Miller, Jr. et al. | 244/3.16 |
| 4,336,542 | 6/1982 | Bielli et al. | 342/362 |
| 4,785,302 | 11/1988 | Ma et al. | 342/362 |
| 5,099,246 | 3/1992 | Skagerlund | 342/361 |

*Primary Examiner*—Gregory C. Issing
*Attorney, Agent, or Firm*—W. C. Schubert; W. K. Denson-Low

[57] ABSTRACT

A satellite orientation detection system disposed to detect the pointing orientation of a geosynchronous satellite (10) relative to a reference location on the earth. The present invention is also capable of ascertaining the angular orientation of a longitudinal axis of the satellite (10) relative to a defined axis on the surface of the earth. A ground station (20) is included for transmitting a first linearly polarized and a second circularly polarized electromagnetic reference beam. The present system also includes a receive antenna (28) coupled to the satellite (10) for receiving the first and second reference beams and for generating an antenna-beam pattern P1 and P2 disposed to rotate about a reference axis A. A rotating polarizer arrangement (44), aligned with the receive antenna (28), periodically varies the portion of the linearly polarized energy within the first reference beam transmitted thereby. The present invention further includes a first network (54) for detecting the intensity of the received portion of said first reference beam and for generating a roll error signal indicative of the angle between the longitudinal axis and the first polarization direction in response thereto. A second network (80) generates pitch and yaw pointing error signals in response to time variation in the intensity of the received portion of the second reference beam.

14 Claims, 6 Drawing Sheets

SATELLITE ORIENTATION DETECTION SYSTEM

BACKGROUND OF THE INVENTION

1. Field of the Invention

This invention relates to systems used to determine the orientation of a geosynchronous orbiting satellite relative to the earth. More specifically, this invention relates to satellite orientation systems which utilize reference signals generated on earth.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

Stabilization of spacecraft in geosynchronous earth orbit has typically been effected by spin stabilization or 3-axis stabilization. In the former approach the craft is induced to spin at launch about a longitudinal axis oriented in a desired direction relative to the earth. However, the instruments deployed on spin-stabilized craft are only trained on the earth during a fraction of each rotation. Consequently, the radiometric resolution of images obtained by these on-board instruments is less than could be achieved were they to be continuously pointed in the direction of the earth. In the 3-axis stabilization approach, the spacecraft or satellite is maintained in a fixed orientation by momentum wheels spinning about the three orientation axes of the craft. A higher duty-cycle is afforded the on-board sensors of 3-axis stabilized satellites compared to those on spin-stabilized satellites.

However, spin-stabilized satellites inherently provide greater orientation stability than those employing 3-axis stabilization. Successful exploitation of the improved instrument performance offered by 3-axis stabilized satellites thus hinges on the provision of precision pointing and angular orientation control. Such control is typically implemented by providing orientation error information to a servo system operative to adjust the alignment of the satellite.

At least two methods currently exist for obtaining error information relating to the orientation of a satellite. In a first method, data from star sensors in combination with orbital parameters provided by an earth-based tracking station furnish reference information for a navigational unit deployed on-board the satellite. In particular, the on-board unit is operative to detect perturbations in a desired orbital pattern once it has been supplied information relating to the orientation and position of the satellite at a reference time. Typical on-board units include either an inertial monitoring unit (IMU), an angular displacement sensor (ADS), or a combination of the two.

One disadvantage of the star-referenced method for obtaining orientation error information is that momentary "interrupts" of spacecraft electronics require that the relative location of the reference star or constellation again be determined in order to appropriately calibrate the on-board unit. The satellite may thus be pointed and angularly oriented incorrectly for significant time periods while the position of a reference star is attempted to be ascertained.

In a second method for sensing the deviation of a satellite from a desired orientation, a multiplicity of distinct earth features are detected by an on-board staring infrared sensor. Information from the sensor is then processed in order to generate an error signal indicative of the satellite orientation. A drawback inherent in the second method is that certain weather conditions can obscure the geological earth features necessary to determine proper alignment of the satellite. Accordingly, control of the pointing and angular orientation of the spacecraft is susceptible to interruption.

Hence, a need in the art exists for a system capable of providing satellite orientation information despite the existence of an atmospheric disturbance or the interruption of on-board electronics.

SUMMARY OF THE INVENTION

The aforementioned need in the art is addressed by the satellite orientation detection system of the present invention. The inventive system is operative to detect the pointing orientation of a geosynchronous satellite relative to a reference location on the earth. The present invention is also capable of ascertaining the angular orientation of a satellite longitudinal reference axis. Circular and linearly polarized reference beams are transmitted to the satellite. A polarization selective receive antenna deployed on the satellite phase and amplitude modulates the intercepted reference beams in accordance with the orientation of a longitudinal axis relative to the earth. The modulated beams are subsequently detected to yield error signals which may be used in a conventional manner to correct the orientation of the satellite.

BRIEF DESCRIPTION OF THE DRAWINGS

FIG. 1(*a*) is an illustrative implementation of a ground transmitter utilized in the satellite orientation detection system of the present invention.

DETAILED DESCRIPTION OF THE INVENTION

Figure 1:
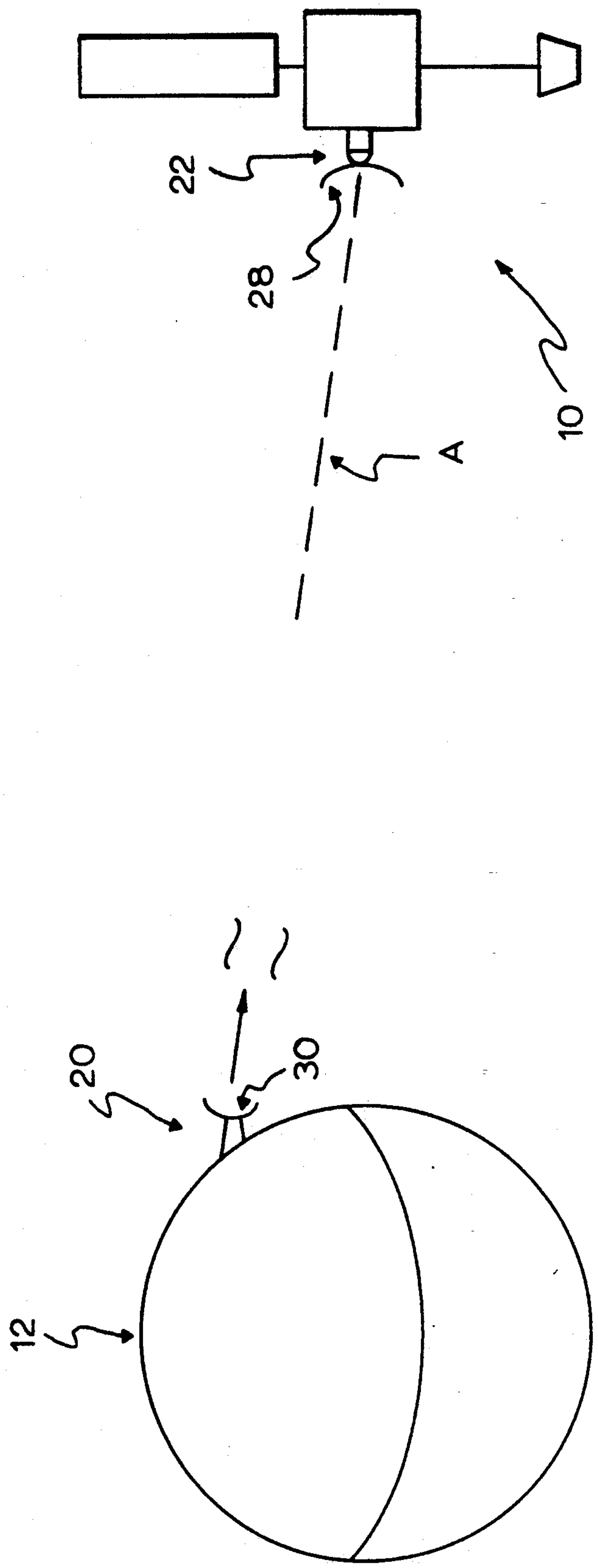
FIG. 1 is an illustrative representation of a 3-axis stabilized geosynchronous satellite in orbit about the earth.
Figure 1A:
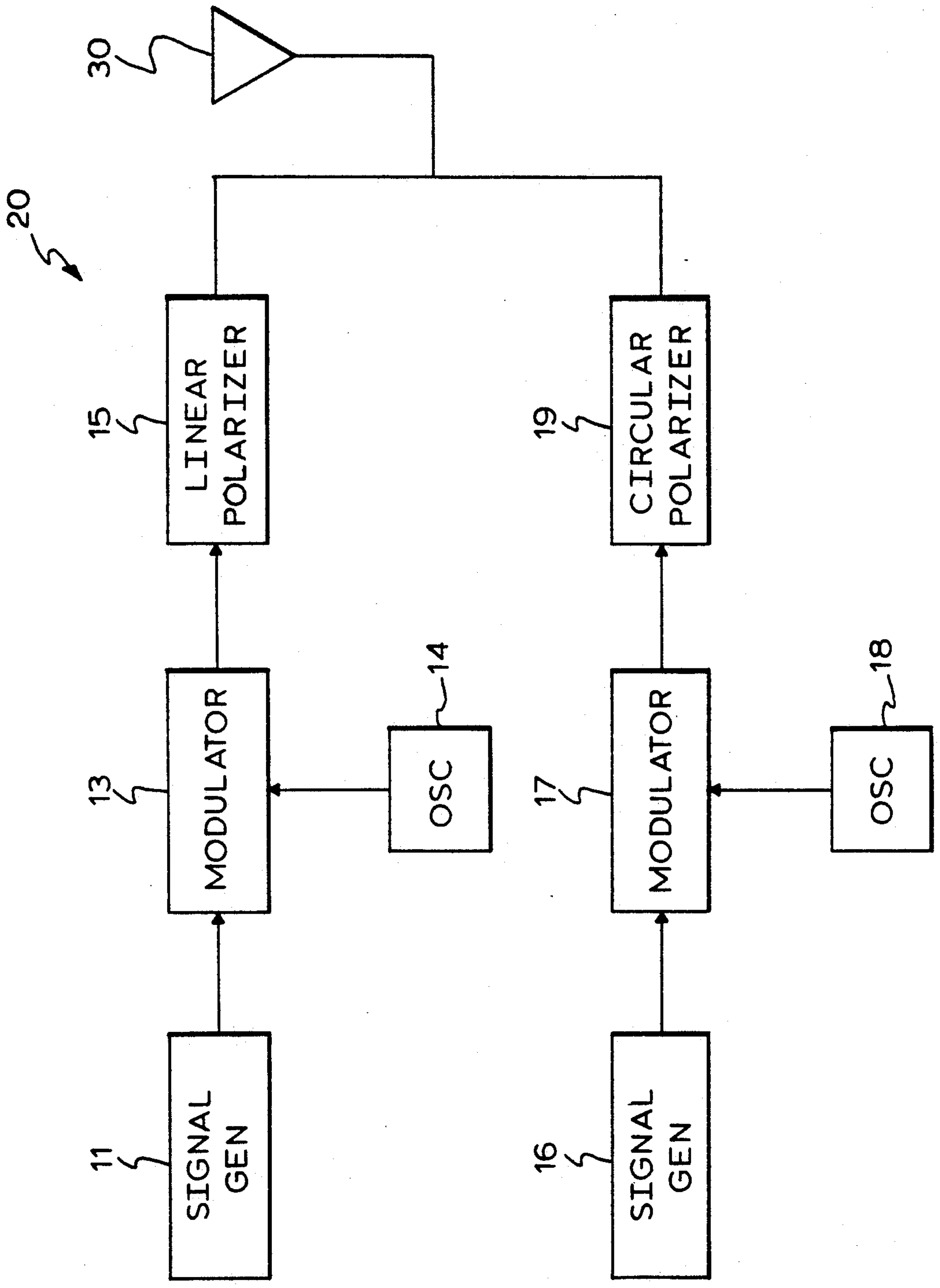

FIG. 1 is an illustrative representation of a 3-axis stabilized geosynchronous satellite 10 in orbit about the earth 12. As indicated in FIG. 1, the satellite orientation detection system of the present invention includes a ground station subsystem 20 and a receiver subsystem 22 deployed on the satellite 10. As described more fully below, the ground station subsystem 20 is operative to transmit a first linearly-polarized and a second circularly-polarized microwave reference beam to the satellite receiver subsystem 22. The receiver subsystem 22 includes a microwave receive antenna arrangement 28 which projects a rotating antenna-beam pattern about a reference axis A. The subsystem 22 is operative to generate a roll error signal indicative of the orientation of the receive antenna arrangement 28 on the satellite 10 relative to the polarization direction of the first microwave reference beam. In addition, the subsystem 22 produces pitch and yaw error signals indicative of the alignment between the reference axis A and the ground station 20. The pitch error signal is proportional to the north-south alignment error, while the yaw error signal corresponds to the east-west alignment error. The pitch, yaw and roll error signals may then be utilized by a control mechanism (not shown) located on the satellite 10 to adjust the orientation thereof.

As shown in FIG. 1, the ground station 20 includes a microwave antenna 30 suitable for transmitting the first and second reference beams to the receiver subsystem 22. As shown in the illustrative transmitter implementation of FIG. 1(*a*), the ground station subsystem 20 includes first reference signal generator 11 which feeds a first modulator 13. The first modulator 13 amplitude-modulates the first reference signal at, for example, 1.0 kHz as provided by a first oscillator 14. The amplitude modulated signal is linearly polarized by a linear polarizer 15 and fed to an antenna 30. A second reference signal generator 16 provides a second reference signal to a second modulator 17. The second modulator amplitude-modulates the second reference signal at, for example, 1.5 kHz as provided by a second oscillator 18. The amplitude modulated second signal is circularly polarized by a circular polarizer 19 and fed to the antenna 30.

Thus the antenna 30 radiates a first linearly polarized reference beam and a second circularly polarized reference beam. The first reference beam is of a first wavelength (e.g. 3 cm.) and is linearly polarized in, for example, the north-south direction relative to the earth. The wavelength of the second, circularly-polarized reference beam (e.g. 3.01 cm.) is chosen to differ slightly from that of the first reference beam to prevent overlap of the spectral content of the modulated beams.

Figure 2:
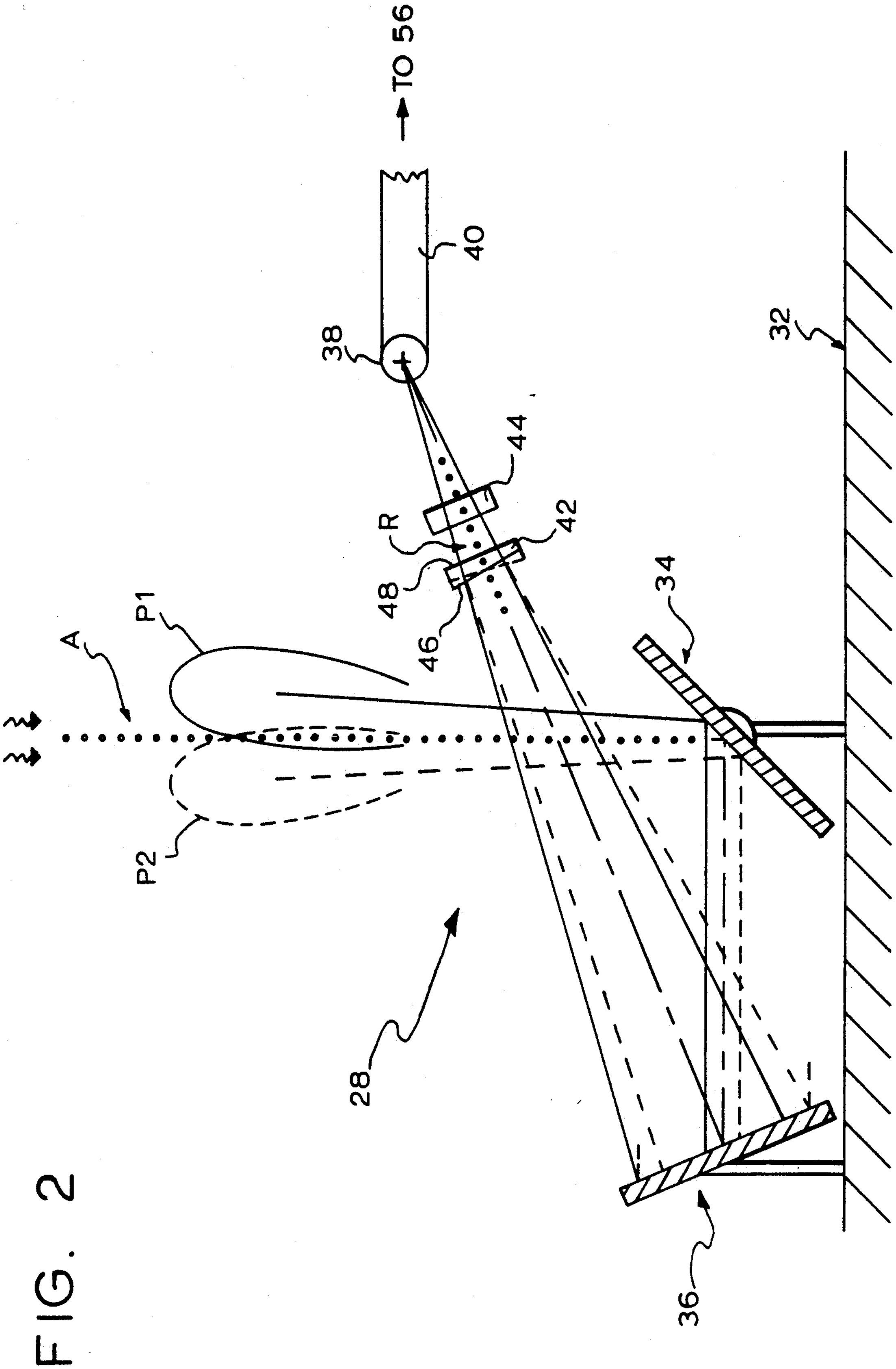
FIG. 2 is a magnified illustrative side view of a receive antenna arrangement constructed in accordance with the teachings of the present invention.

FIG. 2 is a magnified illustrative side view of the receive antenna arrangement 28 wherein a rotating antenna-beam pattern is projected about the reference axis A. The antenna arrangement 28 will typically be coupled to an instrument platform 32 of the satellite 10. The pattern denoted by P1 represents the position of the antenna beam at a first point in time, while the second pattern indicated by P2 represents the position of the antenna beam relative to the axis A at a second point in time. The linearly and circularly polarized radiation from the first and second beams is incident on a controllable two-axis pointing mirror 34 secured to the instrument platform 32. The mirror 34 is fabricated so as to reflect microwave radiation impinging thereon. In response to the pitch and yaw error signals synthesized in the manner described herein, or in response to such signals received directly from a satellite ground station, a drive mechanism (not shown) may be employed to control the orientation of the mirror 34 in order to attain an initial desired relationship between the direction of the reference axis A and the position of the ground station 20. In particular, movement of the mirror 34 resulting in north-south and east-west adjustment in the pointing direction of the reference axis A is controlled in accordance with the pitch and yaw signals, respectively. In this way the receive antenna 28 may be focused upon any location on the surface of the earth in view of the satellite 10. Alternatively, the pitch and yaw error signals may be utilized to adjust the orientation of the entire instrument platform 32 or satellite 10 in order to maintain the focus of the antenna 28 upon a desired terrestrial location.

The portions of the first and second reference beams reflected by the mirror 34 impinge on an off-axis microwave receiving antenna 36. The off-axis antenna 36 is coupled to the platform 32, and is designed to focus incident microwave energy from the first and second reference beams upon a circular antenna feed 38. In addition, the off-axis antenna 36 redirects microwave energy from the mirror 34 to the circular feed 38 in accordance with the antenna beam pattern indicated by P1 and P2.

The antenna feed 38 typically includes a cross-dipole or other radiative element disposed to receive both circularly polarized microwave energy and linearly-polarized microwave energy of arbitrary orientation. The antenna feed 38 is operative to excite transmission within a waveguide structure 40 in response to illumination by microwave radiation from the first and second reference beams. The waveguide structure 40 may be realized by a segment of waveguide or coaxial cable capable of supporting propagation of microwave energy at the frequencies of the first and second reference beams. Interposed between the off-axis antenna 36 and the antenna feed 38 are a rotating wedge-shaped scan modulating disk 42 and a rotating polarizing disk 44. In the embodiment of FIG. 2 the modulating and polarizing disks 42 and 44 are rotated about an axis of rotation R at a uniform angular velocity of 6 Hz. A tangential force is applied to the periphery of each of the disks 42 and 44 by an electro-mechanical arrangement (not shown) in order to induce rotation about the axis R. The scan modulating disk 42 is fabricated from a material such as Lexan, which is transparent to microwave energy. In operation, the disk 42 serves to rotate the antenna beam pattern about the axis A by altering the direction of microwave energy incident upon the antenna feed 38.

As shown in FIG. 2, microwave energy received by the off-axis antenna 36 is refracted by the disk 42 prior to irradiation of the antenna feed 38. The wedge-shape of the disk 42 causes energy passing therethrough to be refracted in a direction which varies in response to the instantaneous orientation of the disk 42 in its rotation about the axis R. Accordingly, the angle of incidence of energy received by the antenna feed 38 from the off-axis antenna 36 will change in a periodic fashion—thus engendering rotation of the antenna-beam pattern P1 and P2 about the axis A. The angle which must exist between a first surface 46 and a second surface 48 of the disk 42 to produce the pattern P1 and P2 can be determined with knowledge of the index of refraction of the disk 42 at the frequency of the microwave energy received by the antenna feed 38.

The polarizing disk 44 includes a polarization grid (not shown) which rotates about the axis R. In particular, the polarizing disk 44 fully transmits incident microwave energy linearly polarized in a first direction relative thereto, and blocks propagation of incident microwave energy having a linear polarization direction differing by ninety degrees from the first direction. It follows that polarizer 44 will alternate between fully passing and fully blocking the linearly polarized microwave energy included within the first reference beam incident thereon at twice the angular rotation frequency of the polarizer 44 (i.e. at 12 Hz.). During assembly of the receiver subsystem 22, the polarization grid is angularly oriented relative to the longitudinal reference axis of the satellite 10 such that a rotation angle of 0 or 180 degrees indicates that the satellite roll angle is oriented in a desired manner relative to the coordinate axes of the earth. For example, assume a desired roll orientation of the satellite 10 is characterized by a north-south longitudinal axis and that the first reference beam is polarized in the north-south direction. The receiver subsystem 22 is then assembled such that if the longitudinal axis of the satellite is aligned in the preferred north-south direction, then substantially all of the north-south polarized first reference beam incident on the disk 44 will be transmitted at rotation angles of 0 and 180 degrees.

When the orientation of the satellite longitudinal axis deviates from the desired north-south direction, less than the entire portion of the north-south polarized reference beam incident on the disk 44 will be transmitted at rotation angles of 0 and 180 degrees. At these rotation angles, the polarization grid of the disk 44 is not aligned with the polarization direction (e.g. north-south) of the microwave energy within the first reference beam.

Figure 3:
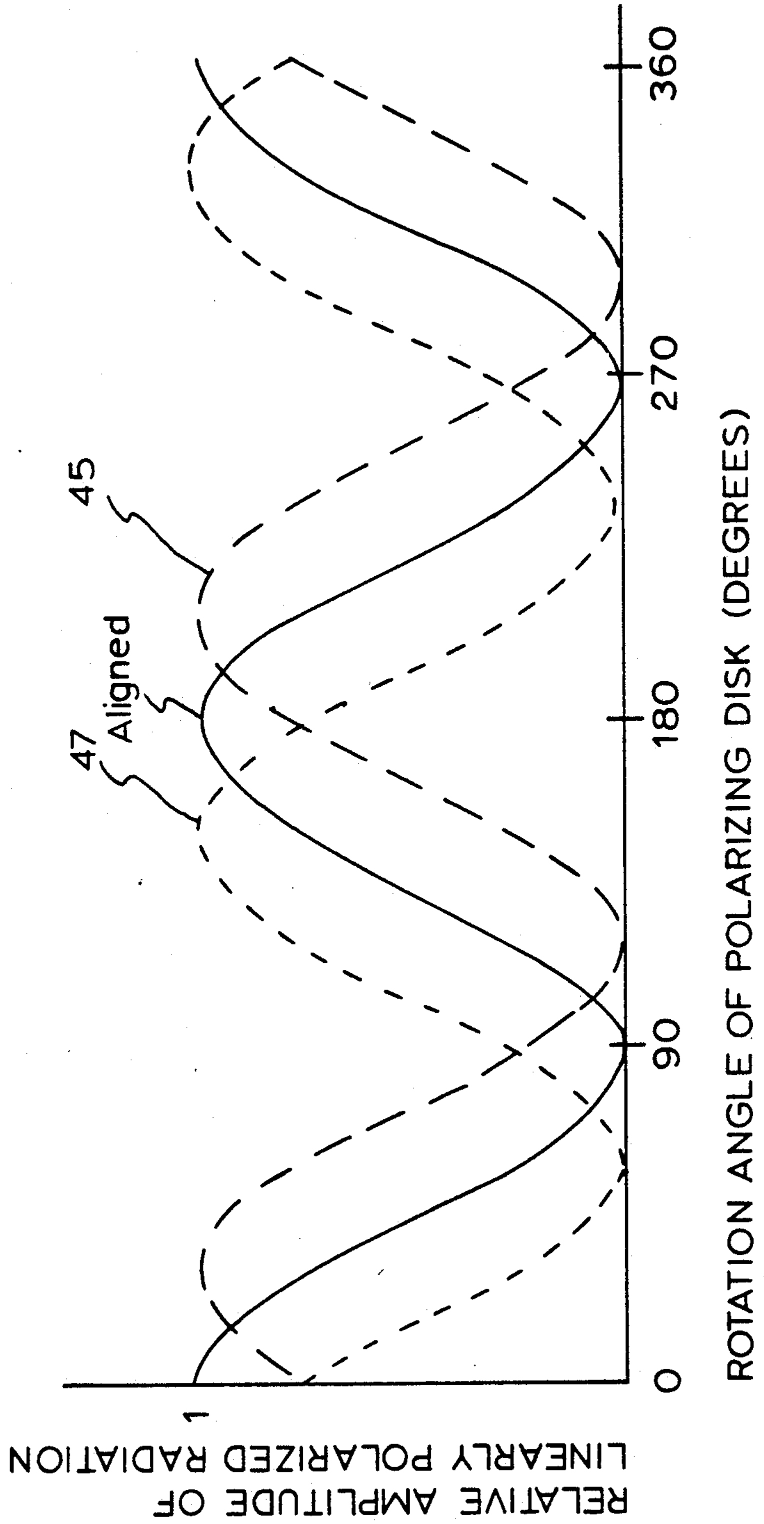
FIG. 3 graphically depicts the relative intensity of a first linearly polarized reference beam modulated by a rotating polarization disk utilized in the satellite orientation detection system of the present invention as a function of the rotation angle thereof.

FIG. 3 graphically depicts the relative intensity of the portion of the first reference beam transmitted by the disk 44 as a function of the rotation angle thereof for several satellite roll-angle orientations. Specifically, the solid curve represents the relative intensity of the portion of the first reference beam transmitted by the disk 44 when the longitudinal axis of the satellite roll orientation is in the desired (e.g. north-south) alignment. FIG. 3 also includes a pair of dashed curves 45 and 47 which represent the intensity of the portions of the first reference beam transmitted by the disk 44 when the longitudinal axis of the satellite is rolled by 30 degrees in clockwise and counterclockwise directions, respectively, relative to the desired north-south alignment.

The information provided by FIG. 3 may be utilized to synthesize a roll-error signal indicative of the orientation of the longitudinal axis of the satellite relative to the polarization direction of the first reference beam. As mentioned above, the roll-error signal can then be employed to control repositioning of, for example, the satellite 10 or instrument platform 32.

Figure 4:
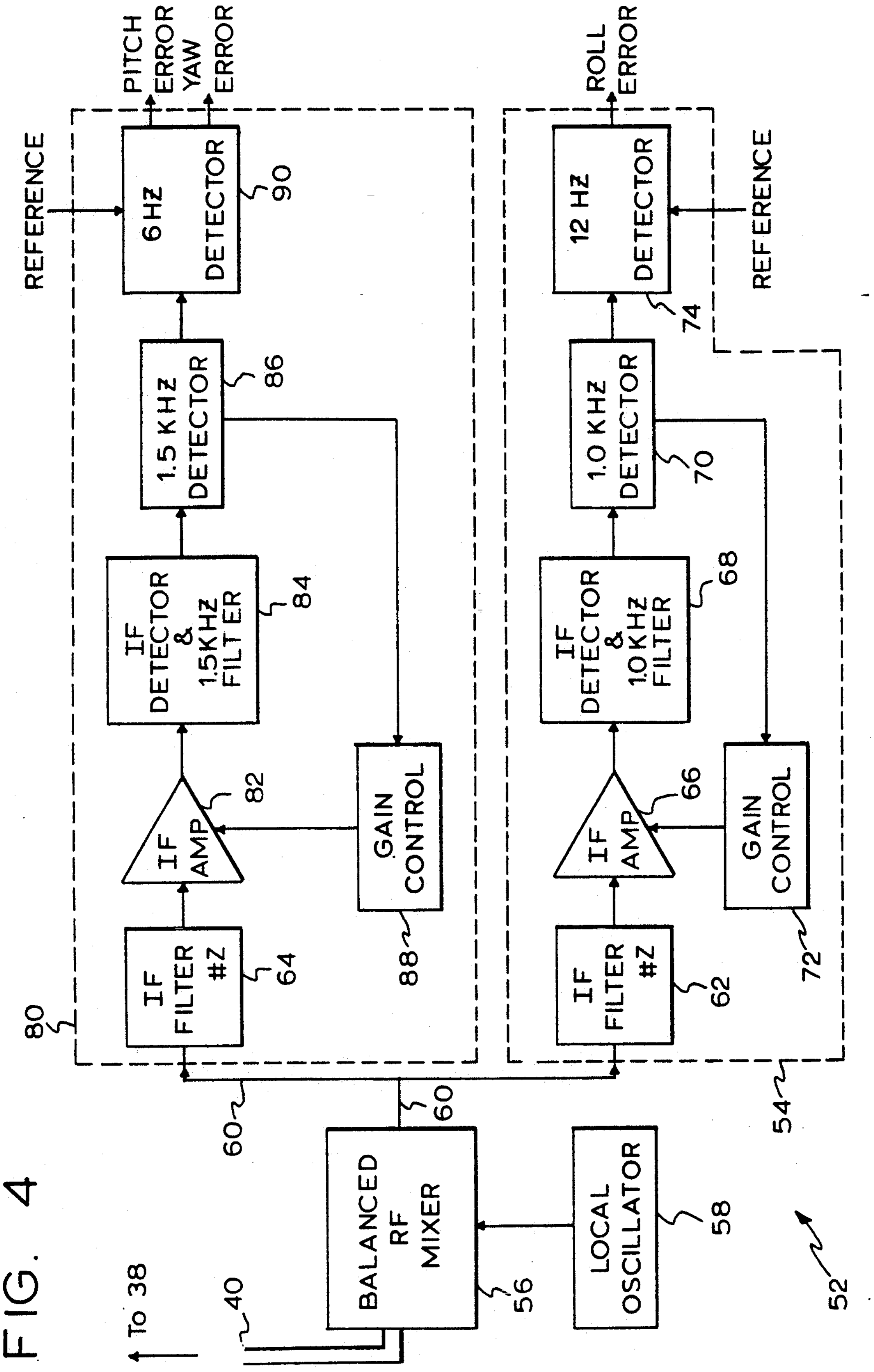
FIG. 4 is a block diagram of a detection circuit for the satellite orientation detection system of the present invention.

FIG. 4 is a block diagram of a detection circuit 52 which includes a first network 54 for generating a roll-error signal. The portion of the first reference beam transmitted by the disk 44, collected by the antenna feed element 38 and directed onto the waveguide structure 40 is fed thereby to a balanced RF mixer assembly 56. The assembly 56 is conventionally coupled to the waveguide 40 via a waveguide probe, and may include a low-noise microwave amplifier in electrical communication with the probe. The microwave signal is then passed to a first port of a mixer (not shown), where it is mixed with a signal from a local oscillator 58 to generate a first intermediate frequency (I.F.) signal. The first I.F. signal is of a first intermediate frequency which may be determined by those skilled in the art with knowledge of the frequency of the first reference beam and the frequency of the local oscillator 58.

The first I.F. signal is carried by a transmission line 60 to first and second I.F. filters 62 and 64. The second I.F. filter 64 is tuned to reject signals of the first intermediate frequency, while the first I.F. filter has a passband which encompasses the first intermediate frequency. After passing through the first I.F. filter 62, the first I.F. signal is amplified by a first I.F. amplifier 66. The amplitude of the first I.F. signal is then detected by a first I.F. detector network 68. The first I.F. detector network 68 will generally include a resonant circuit tuned to the first intermediate frequency, with the resonant circuit being followed by a filter having a passband centered at the frequency (e.g. 1 kHz) of the amplitude modulation impressed on the first reference beam. The first I.F. detector circuit is coupled to a first amplitude modulation detection circuit 70. The magnitude of the electrical output of the circuit 70 is sampled by a first control circuit 74 operative to adjust the gain of the amplifier 66.

The electrical output of the circuit 70 also addresses a roll-error detection circuit 74. Changes in phase of the modulated amplitude of the detected 1 kHz electrical output signal from the circuit 70 will reflect the roll orientation changes of the satellite relative to the polarization angle of the first linearly polarized reference beam. It follows that by measuring the phase of the electrical output from the circuit 70, the roll-error detection circuit 74 may be used to determine the corresponding roll-orientation of the satellite relative to the polarization phase of the received portion of the first reference beam. The detection circuit 74 performs the phase measuring operation by comparing the phase of the signal from the detection circuit 70 with a reference signal that has the same frequency (12 Hz) as the detected signal and which is fixed in phase relative to the angular orientation between the disk 44 and the satellite longitudinal axis. This reference signal is derived from, for example, an angle position arrangement (not shown) which mechanically senses the angular orientation of the disk 44 relative to the satellite longitudinal axis. By comparing the magnitude of the samples taken at known orientations of the disk 44 with the maximum signal magnitude from the circuit 70, the relative magnitude of the samples taken by the circuit 74 may be determined. By comparing the relative phase of the detected signal from the circuit 70 with information such as that included within FIG. 3, the circuit 74 synthesizes a roll-error detection signal indicative of the deviation in the orientation of the satellite longitudinal axis from the polarization direction of the first reference beam. Again, the roll-error detection signal may then be used to control adjustment of the roll orientation of the satellite 10 or subsystem thereof so as to maintain appropriate roll alignment with the first reference beam.

In addition to a roll-error signal, the satellite orientation detection system of the present invention is operative to provide pitch and yaw error signals indicative of the north-south and east-west pointing direction of the reference axis A relative to the ground station 20. As the orientation of the axis A relative to the ground station 20 uniquely defines the pointing direction of the satellite 10, the pitch and yaw error signals may be used to point the satellite 10 to any desired terrestrial location within the line of sight thereof. As shown in FIG. 2, the antenna-beam pattern generally indicated by P1 and P2 revolves around the reference axis A due to rotation of the scan modulating disk 42. It is thus apparent that the gain of the antenna 28 is time-invariant with respect to incident radiation (e.g. the second reference beam) aligned with the reference axis A. In contrast, the intensity of radiation impinging on the antenna feed 38 when the second reference beam is not aligned with the axis A will vary as a function of the instantaneous position of the revolving antenna-beam. As explained in more detail below, by monitoring the magnitude of the portion of the second reference beam impinging on the antenna feed 38 as a function of the angular position of the antenna-beam, the pointing direction of the reference axis A relative to the ground station 20 may be determined.

Figure 5:
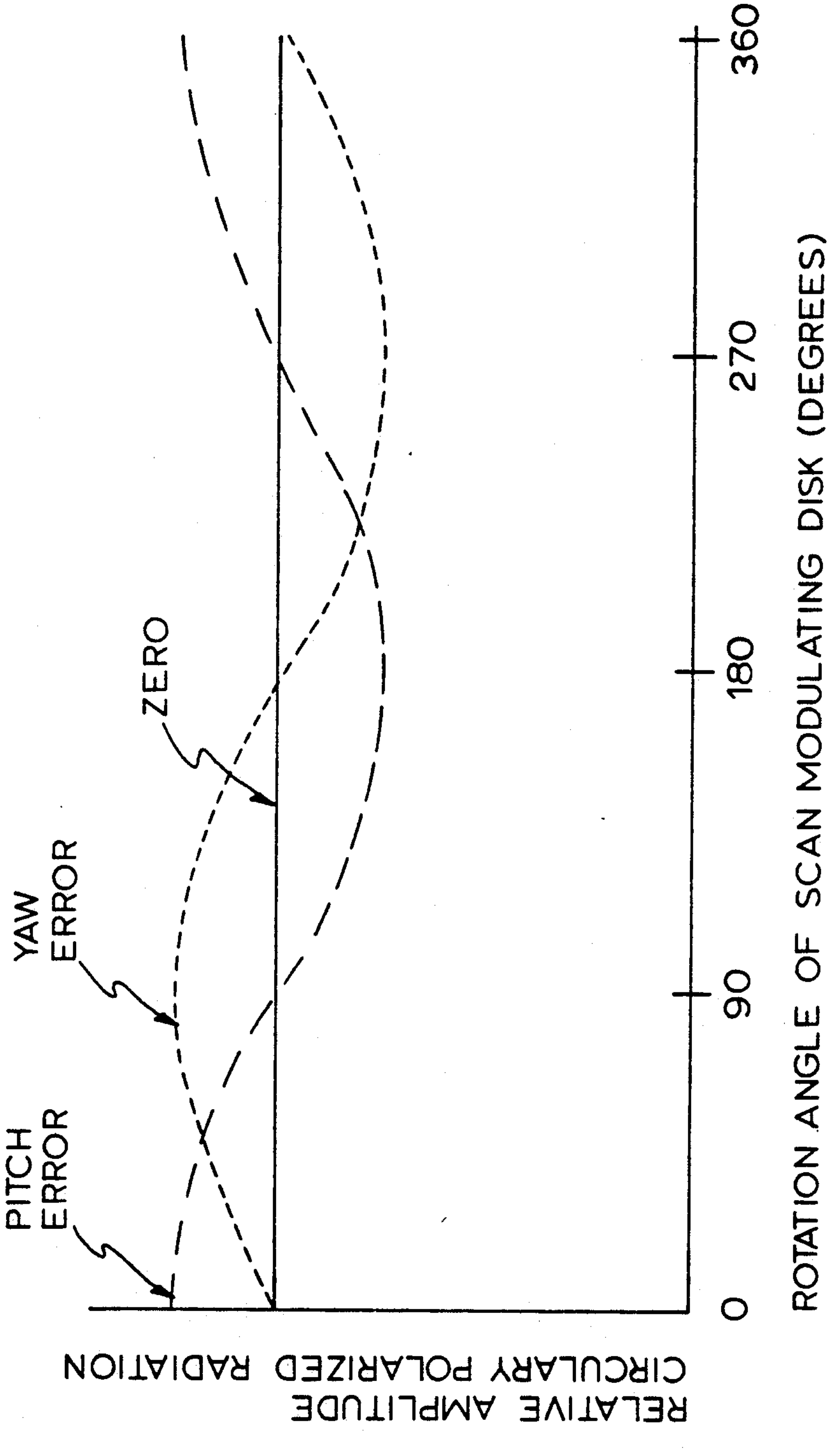
FIG. 5 graphically depicts the relative intensity of the received portion of a second circularly polarized reference beam as a function of the angular position of a scan modulating disk utilized in the detection system of the present invention.

As shown in FIG. 2, the portion of the second reference beam incident on the antenna 28 is focused by the mirror 34 and off-axis antenna 36 upon the antenna feed 38. Disposed between the off-axis antenna 36 and the feed 38 are the scan modulating and polarizing disks 42 and 44. Again, the disk 42 is substantially transparent to microwave energy at the frequency (e.g. 3.01 cm.) of the second reference beam. In addition, since the second reference beam is circularly polarized the transmissivity of the disk 44 with respect thereto does not vary as a function of angular orientation of the disk 44. Accordingly, when the second reference beam is not aligned with the axis A the intensity of the portion thereof impinging on the feed 38 periodically varies in response to rotation of the antenna-beam pattern P1 and P2. FIG. 5 graphically depicts the relative intensity of the portion of the second reference beam impinging on the antenna feed 38 as a function of the angular position of the scan modulating disk 42. As shown in FIG. 5, the relative intensity of the second reference beam illuminating the feed 38 is independent of the angular orientation of the disk 42 when the axis A is aligned with the ground station 20. In contrast, a pair of dashed curves illustrate the sinusoidal variation in the intensity of the portion of the second reference beam incident on the feed 38 when the reference axis A is incorrectly aligned with respect to the ground station 20 in the north-south (pitch error), and east-west (yaw error) directions. The angular position of the disk 42 may be adjusted during assembly of the receiver subsystem 22 such that, for example, a rotation angle of zero degrees in FIG. 5 results in projection of the antenna-beam pattern due north of the reference axis A. Accordingly, by sampling the magnitude of the portion of the second reference beam received by the feed 38 as a function of the angular orientation of the disk 42, the direction of the reference axis A relative to the ground station 20 may be determined.

Referring again to FIG. 4, a second network 80 included within the detection circuit 52 is operative to determine the magnitude of the received portion of the second reference beam in order to generate pitch and yaw error signals indicative of the pointing direction of the reference axis A relative to the ground station 20. Again, the portion of the second reference beam detected by the antenna feed element 38 is directed onto the waveguide structure 40 and fed thereby to a balanced RF mixer assembly 56. A second I.F. signal at a second intermediate frequency is provided by the mixer assembly 56 by mixing the energy from the second reference beam carried by the waveguide 40 with the reference from the local oscillator 58. The second I.F. signal is carried by the transmission line 60 to the first and second I.F. filters 62 and 64. The first I.F. filter 62 is tuned to reject signals of the second intermediate frequency, while the second I.F. filter 64 has a passband which encompasses the second intermediate frequency. Subsequent to passing through the second I.F. filter 64, the second I.F. signal is amplified by a second I.F. amplifier 82.

The second I.F. signal is then detected by a second I.F. detector network 84. The second I.F. detector network 84 will generally include a resonant circuit tuned to the second intermediate frequency, with the resonant circuit being followed by a filter having a passband centered at the frequency of the amplitude modulation impressed on the second reference beam (e.g. 1.5 kHz). The second I.F. detector circuit is coupled to a second amplitude modulation detection circuit 86. The average magnitude of the electrical output of the circuit 86 is sampled by a second control circuit 88 operative to adjust the gain of the amplifier 82.

The electrical output of the circuit 86 also addresses a pitch and yaw error detection circuit 90. Again, it is observed that changes in magnitude of the 1.5 kHz electrical output from the circuit 86 will reflect angular pointing changes of the satellite relative to the location on the earth of the second reference beam. It follows that by sampling the magnitude of the electrical output from the circuit 86 at specific angular positions of the disk 42, the detection circuit 90 may be used to determine the corresponding pitch and yaw pointing direction of the satellite relative to the location of the ground station 20. The detection circuit 90 samples the amplitude difference of the detected signal from the circuit 86 when the disk 42 is, for example, aligned with the pitch and yaw axes of the satellite. Such alignment occurs twice with respect to each axis during each revolution of the disk 42.

Sampling is triggered in response to receipt by the circuit 90 of reference pulses generated by, for example, mechanically sensing the orientation of the disk 42. By comparing the relative amplitude differences of the samples taken by the circuit 90 with information such as that included within FIG. 5, the circuit 90 synthesizes pitch and yaw error detection signals indicative of the deviation in the pointing direction of the satellite 10 from the ground station 20. Again, the pitch and yaw error detection signals may then be used to control adjustment of the orientation of the satellite 10 or subsystem thereof so as to maintain appropriate alignment of the reference axis A of the antenna 28.

While the present invention has been described herein with reference to a particular embodiment, it is understood that the invention is not limited thereto. The teachings of this invention may be utilized by one having ordinary skill in the art to make modifications within the scope thereof. For example, the frequency rather than the amplitude of the first and second reference beams may be modulated by the ground station without departing from the scope of the present invention. In this instance those skilled in the art would know to modify the electrical detection circuit within the receiver subsystem to allow recovery of the frequency modulating signal. In addition, the present invention is not limited to the method described herein for rotating the satellite antenna-beam about the antenna reference axis. For example, rotation of the beam pattern may be effected by appending a wedge-shaped reflective element directly to a rotating off-axis antenna.

Accordingly,

What is claimed is:

1. A system for detecting the pointing and roll orientation of a geosynchronous satellite relative to a reference location on the earth, said satellite having a pointing direction and a longitudinal axis, comprising:

a ground station for transmitting first and second reference beams of electromagnetic energy, said first beam being linearly polarized along a first axis and said second beam being circularly polarized;

a receive antenna, coupled to said satellite, for receiving said first and second reference beams and for generating an antenna-beam pattern which rotates about a reference axis;

rotating polarizer means, aligned with said receive antenna, for periodically varying the portion of said linearly polarized energy within said first reference beam transmitted thereby and for transmitting said circularly polarized second reference beam;

first means for detecting the intensity of said received portion of said first reference beam and for generating a roll error signal indicative of the angle between said longitudinal axis and said first axis in response thereto; and second means for generating pitch and yaw error signals indicative of the orientation of said reference axis relative to said reference location in response to time variation in the intensity of said received portion of said second reference beam.

2. The orientation detection system of claim 1 wherein said ground station includes means for modulating said first reference beam with a first modulating signal of a first frequency and means for modulating said second reference beam with a second modulating signal of a second frequency.

3. The orientation detection system of claim 2 wherein said rotating polarizer means includes a polarizing disk which transmits substantially all of said first reference beam incident thereon when oriented in alignment with said first axis, and which transmits substantially none of said first reference beam incident thereon when oriented approximately ninety degrees from said first axis.

4. The orientation detection system of claim 3 wherein said receive antenna means further includes a scan modulating disk aligned with said polarizing disk for rotating said antenna-beam pattern.

5. The orientation detection system of claim 4 wherein said scan modulating disk is transparent to said first and second reference beams and has a wedge-shaped cross-section along a first axis thereof.

6. The system of claim 5 wherein said scan modulating disk and said polarizing disk rotate about a common axis at an identical angular velocity.

7. The system of claim 1 further including a two-axis pointing mirror coupled to said satellite for adjusting the direction of said reference axis.

8. The orientation detection system of claim 2 wherein said receiving means includes:

an antenna feed and mixer means for generating a first intermediate frequency signal in response to said received portion of said first reference beam and for generating a second intermediate frequency signal in response to said received portion of said second reference beam.

9. The orientation detection system of claim 8 wherein said first means includes a first intermediate frequency detector for detecting said first intermediate frequency signal and wherein said second means includes a second intermediate frequency detector for detecting said second intermediate frequency signal.

10. The orientation detection system of claim 9 wherein said first means further includes a first low-frequency detector coupled to said first intermediate frequency detector for detecting said first modulating signal, and a second low-frequency detector coupled to said second intermediate frequency detector for detecting said second modulating signal.

11. The orientation system of claim 10 wherein said first means includes means for generating a first scan reference signal indicative of the orientation of said polarizing disk and said second means includes means for generating a second scan reference signal in response to the orientation of said scan modulating disk.

12. The orientation system of claim 11 wherein said first means includes a first sampling circuit for generating a roll error signal response to said detected first modulating signal and to said first scan reference signal.

13. The orientation system of claim 12 wherein said second means includes a second sampling circuit for generating pitch and yaw error signals in response to said detected second modulating signal and to said second scan reference signal.

14. A method for detecting the pointing and roll orientation of a geosynchronous satellite relative to a reference location on the earth, said satellite having a pointing direction and longitudinal axis, comprising the steps of:

a) transmitting first and second reference beams of electromagnetic energy, said first beam being linearly polarized along a first axis and said second beam being circularly polarized;

b) projecting an antenna-beam pattern from said satellite;

c) rotating said antenna-beam pattern about said reference axis;

d) positioning a rotating polarizer coupled to said satellite in alignment with said first and second reference beams;

e) varying the portion of said first reference beam transmitted by said rotating polarizer;

f) receiving said transmitted portions of said first and second reference beams;

g) detecting the intensity of said received portion of said first reference beam and generating a roll error signal indicative of the angle between said longitudinal axis and said first axis in response thereto; and h) generating pitch and yaw error signals in response to the intensity of said received portion of said second reference beam.

* * * * *